United States Patent [19]

Nishikawa

[11] Patent Number: 5,666,478

[45] Date of Patent: Sep. 9, 1997

[54] METHOD AND APPARATUS FOR PROCESSING CHARACTERS BASED ON PREVIOUSLY- USED SCALABLE FONT DATA

[75] Inventor: Yoko Nishikawa, Yokohama, Japan

[73] Assignee: Canon Kabushiki Kaisha, Tokyo, Japan

[21] Appl. No.: 551,960

[22] Filed: Nov. 2, 1995

Related U.S. Application Data

[63] Continuation of Ser. No. 125,225, Sep. 23, 1993, abandoned.

[30] Foreign Application Priority Data

Sep. 24, 1992 [JP] Japan ................................. 4-277772

[51] Int. Cl.$^6$ ................................................ G06K 15/00
[52] U.S. Cl. .................. 345/468; 395/101; 395/102; 395/109; 395/110; 395/151; 395/167; 395/168; 1100/76
[58] Field of Search .............................. 395/101, 102, 395/109, 110, 550, 700, 150, 151, 167, 168; 400/76

[56] References Cited

U.S. PATENT DOCUMENTS

| | | | |
|---|---|---|---|
| 4,464,712 | 8/1984 | Fletcher | 395/425 |
| 4,594,674 | 6/1986 | Boulia et al. | 395/150 |
| 5,044,790 | 9/1991 | Kawamura | 400/76 |
| 5,051,925 | 9/1991 | Kadono et al. | 395/150 |
| 5,138,696 | 8/1992 | Nagata | 395/110 |
| 5,208,908 | 5/1993 | Harrison et al. | 395/150 |
| 5,233,685 | 8/1993 | Landes et al. | 395/147 |
| 5,293,477 | 3/1994 | Matoba | 395/150 |
| 5,345,548 | 9/1994 | Nomura et al. | 395/150 |
| 5,444,829 | 8/1995 | Kawabata et al. | 395/100 |

Primary Examiner—Kenneth S. Kim
Attorney, Agent, or Firm—Fitzpatrick, Cella, Harper & Scinto

[57] ABSTRACT

Character processing uses character pattern information generated from a previously-used scalable font when outputting image information for subsequent characters. Attribute information for the font which was used in generated the previously-used character pattern information is stored. Thereafter, during an idle state, character pattern information for subsequent characters is generated from a scalable font having the same attribute information as that of the previously-used scalable font based on the stored attribute information.

21 Claims, 9 Drawing Sheets

METHOD AND APPARATUS FOR PROCESSING CHARACTERS BASED ON PREVIOUSLY- USED SCALABLE FONT DATA

This application is a continuation of application Ser. No. 08/125,225 filed Sep. 23, 1993, now abandoned.

BACKGROUND OF THE INVENTION

1. Field of the Invention

The present invention relates to a character processing method and a character processing apparatus that analyze data supplied from a host apparatus to generate a character pattern while referring to scalable font data.

2. Related Background Art

Hitherto, an apparatus of the foregoing type prints scalable fonts in such a manner that information relating to an attribute of the fonts transmitted from a host computer is analyzed and the font is developed into an actual pattern in accordance with the result of the analysis. The pattern once developed is stored in a cache memory or the like, and the developed pattern is used when the same print information is transmitted at the next operation so that the time taken to complete the printing process can be shortened.

However, the conventional structure is arranged in such a manner that all character patterns, that are not used frequently, are stored. Further, a character that is used for the first time is processed in such a manner that data is received from the host computer and the character is developed into a pattern at the time of processing the data. Therefore, the effect of shortening the time taken to complete the printing operation can be obtained the second time the character is received. On the contrary, there arise problems in that the data processing efficiency deteriorates and that the time taken to complete the operation of printing the scalable font cannot be shortened efficiently.

SUMMARY OF THE INVENTION

The present invention is directed to overcoming the foregoing problems, and accordingly, an object of the present invention is to provide a character processing method and a character processing apparatus that preferentially storing a character pattern, which will probably be used, while getting information about state of use of generated character patterns during standby for processing data supplied from a host apparatus to shorten considerably the time taken to complete the character pattern generation process with respect to data supplied from the host apparatus.

In order to achieve the foregoing objects, according to one aspect of the present invention, there is provided a character processing method and a character processing apparatus comprising: a step of getting, during a process of data supplied from a host apparatus, information about state of use of sequentially generated character patterns while referring to stored scalable font data; a step of sequentially storing, during standby for receiving data supplied from the host apparatus, character patterns on a memory in descending order of following use while analyzing the information about state of use of gotten character patterns; and a step of preferentially reading a character pattern corresponding to received data at the time of commencing an ensuing process of data supplied from the host apparatus.

According to another aspect of the present invention, there is provided a character processing method and a character processing apparatus comprising: pattern generating means for generating a character pattern, which coincides with data received from a host apparatus, while referring to scalable font data to be stored previously; storage means for storing the character pattern which can be generated by the pattern generating means; means for getting information about state of use of the character patterns sequentially generated by the pattern generating means; permission means which permits registration of the character pattern output in accordance with the information about use of the character patterns gotten by the means to the storage means if discrimination means has discriminated that the state of processing data supplied from the host apparatus in a standby state; and switch means that retrieves the character pattern registered in the storage means in accordance with the data supplied from the host apparatus to switch a source for generating the character pattern which coincides with the received data to either of the storage means or the pattern generating means.

Since a character processing method and a character processing apparatus according to the present invention have an arrangement that the storage means is secured in an exclusive storage region in a predetermined storage medium or a vacant area in a working area and the character pattern is preferentially registered in the exclusive storage region, deletion of the character pattern which will probably be used due to access made to the working area from another portion can be prevented.

Since a character processing method and a character processing apparatus according to the present invention further comprise prediction means that analyzes the information about use of the character patterns gotten by the getting means to predict a character pattern which will probably be used, a character pattern which will probably be used can always be stored even if the state of use is changed.

Since a character processing method and a character processing apparatus according to the present invention have an arrangement that the prediction means refers to the attribute of a font used immediately previously to or the attribute of a font which has been gotten by the getting means and which is output frequently during standby for processing data supplied from the host apparatus so that a character pattern which will probably be used is predicted, a character pattern, which will probably be used, can be predicted in accordance with the font attribution.

Other and further objects, features and advantages of the invention will be appear more fully from the following description.

DESCRIPTION OF THE PREFERRED EMBODIMENTS

Figure 1:
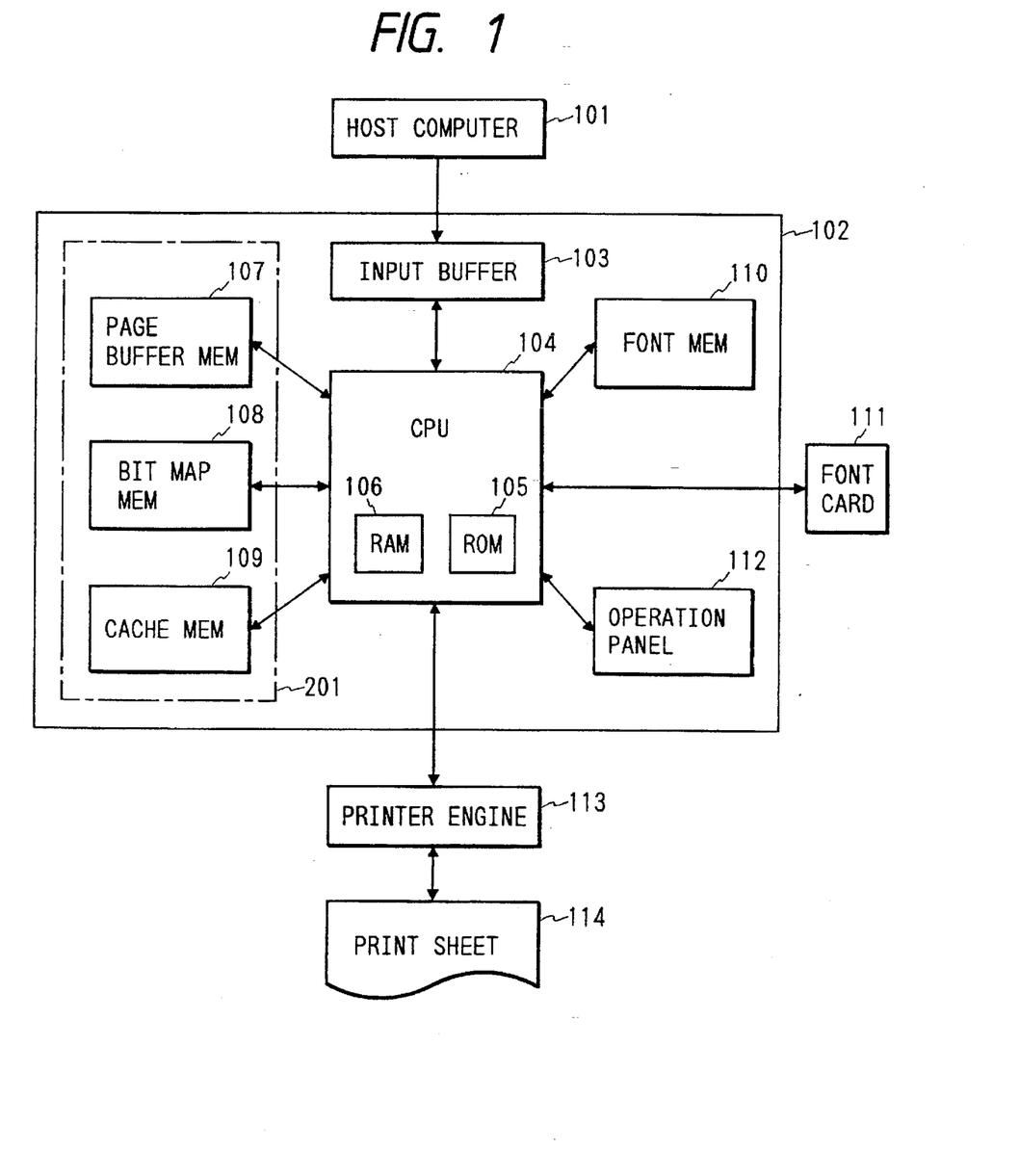
FIG. 1 is a block diagram which illustrates the structure for controlling a character processing apparatus according to an embodiment of the present invention.

FIG. 1 is a block diagram which illustates a structure for controlling a character processing apparatus according to an embodiment of the present invention, the character processing apparatus being adapted to, for example, a laser beam printer (LBP). However, the apparatus to which the present invention is adapted may be a LED printer or an ink jet printer. Further, the generated characters may be transmitted to a display apparatus (a CRT display or an LCD display or the like) in place of the printer engine.

If the function of the present invention can be executed, the present invention may be realized in a single apparatus or a system (a processing system by making use of a network, such as LAN) composed of a plurality of apparatuses or a system for executing the function in accordance with a supplied program and composed of a single or a plurality of apparatuses.

Referring to FIG. 1, reference numeral 101 represents a host computer that transmits output information comprising print data and control codes to a printing control apparatus 102. Reference numeral 103 represents an input buffer for storing received data, 104 represents a CPU for controlling the apparatus and 105 represents a ROM in which a program for controlling a LBP is stored. Reference numeral 106 represents a RAM for use during the printing operation, 107 represents a page buffer memory for storing page for each page the input data and 108 represents a bit map memory for storing output images for one page. Reference numeral 109 represents a cache memory, 110 represents a font memory for storing various information items of fonts, and 111 represents a font card which stores various information items of fonts that are not included. Reference numeral 112 represents an operation panel with which various setting operations are performed and on which messages are displayed, and 113 represents a printer engine for outputting the bit map developed on the bit map memory 108 on to a print sheet, which is a recording medium. Reference numeral 114 represents a print sheet on which the characters are printed. In this embodiment, characters of the scalable font, which has been used most frequently during the previous operation, are developed in a sequential order based on the frequency of use, and the scalable font is stored in a free area of the cache memory 109 of the RAM 201.

In the character processing apparatus thus-arranged, if discrimination means (CPU 104) has discriminated that the state of processing data supplied from the host computer 101 is in a standby state, permission means (CPU 101) permits the transmitted character pattern to be registered into the cache memory 109 in accordance with information about the usage state which corresponds to the attribute of the used character pattern gotten by getting means (function of the CPU 101 is utilized). The character pattern registered in the cache memory 109 is retrieved in accordance with data received from the host computer 101. The generation source of the character pattern that coincides with the data received by switch means (CPU 101) is switched to either of the cache memory 109 or pattern generation means (realized by the bit map development by means of the CPU 104). Therefore, the character patterns which are used frequently are always stored in the memory means even if data received succeedingly is somewhat changed. As a result, the character pattern can be generated while preferentially reading the generated character pattern.

Further, the storage means is constituted on the RAM 201 to secure an exclusive storage region for a predetermined storage medium or a vacant area for the work area, and the character pattern is preferentially registered in the exclusive storage region. Therefore, deletion of the character pattern, that is used frequently, due to the access made to the work area from the other portion can be prevented.

In addition, the character pattern, which will probably be used, is predicted by prediction means (realized by the function of the CPU 101) while analyzing the information about the state of use gotten by the getting means. Therefore, the character pattern, which is used frequently, can always be stored even if the state of usage is changed.

The prediction means predicts, during the state in which processing of the data supplied from the host apparatus is waited, the character pattern that is used frequently with reference to the attribute of the font gotten by the getting means and used immediately previously or the attribute of the font gotten by the getting means and output frequently. Therefore, the character pattern, that is used frequently, can be predicted in accordance with the attribute of the font.

The scalable font developed and stored in the idle state is called an "idle font" hereinafter. Further, the font for use in this embodiment is categorized to the scalable font.

Figure 2:
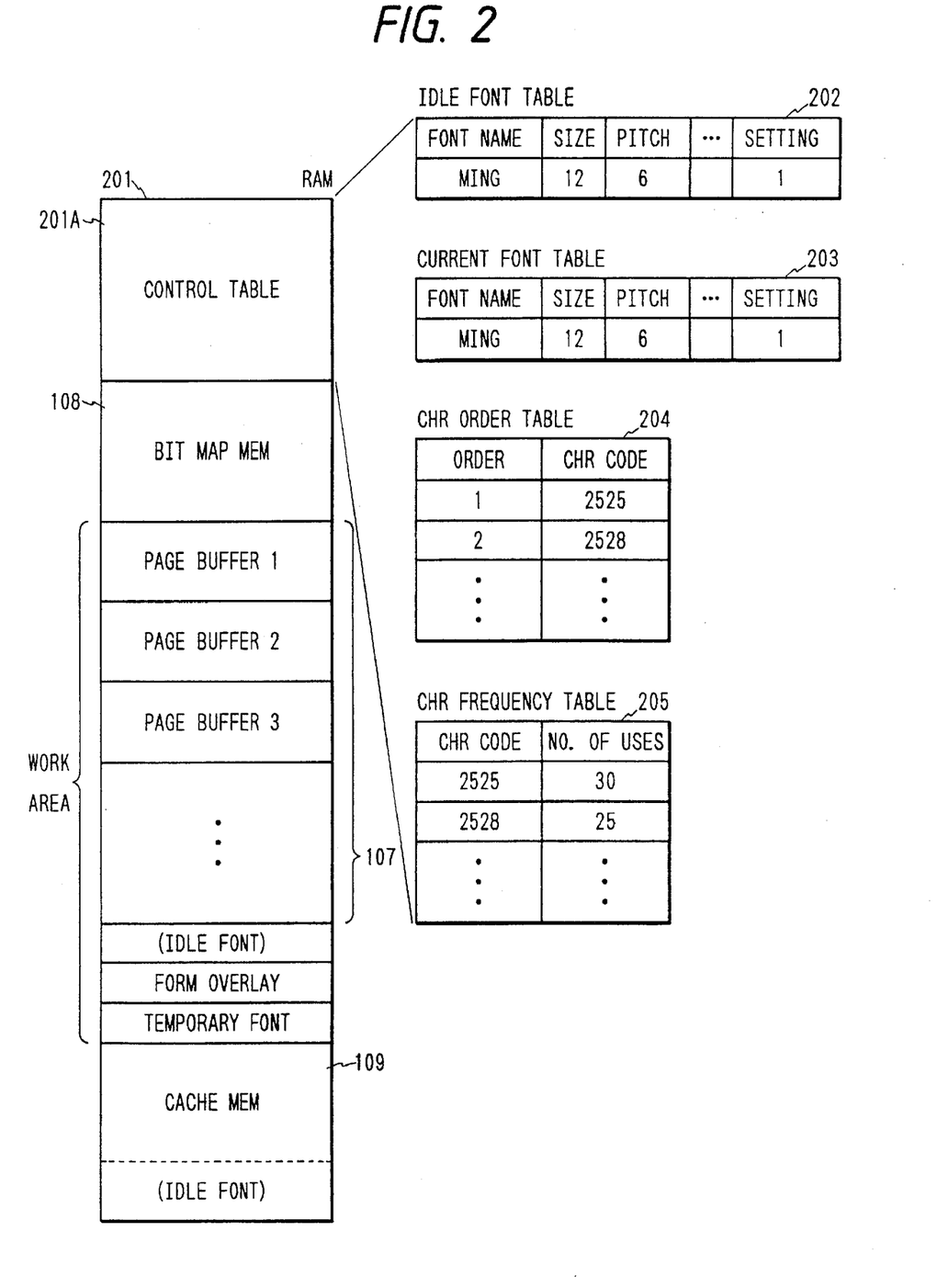
FIG. 2 is a schematic view which illustrates a memory map in the RAM shown in FIG. 1.

FIG. 2 is a schematic view which illustrates the memory map in the RAM 201 shown in FIG. 1.

Referring to FIG. 2, reference numeral 201A represents a control table comprising an idle font table 202, a current font table 203, a character-order table 204, and a character-frequency table 205. The bit map memory 108 serves as a memory in which the image to be output is developed. The page buffer 107 serves as a memory for analyzing the received data and storing, for each page, the internal data for developing the analyzed data into the bit map. In the control table 201A, each of the foregoing tables needed at the time of proceeding data is stored. In the working region, the font and the overlay temporarily registered by a user are stored. In the page buffer memory 107, data is written in the ascending order of the address. On the other hand, the font and the overlay registered temporarily are written in the descending order to the address. Therefore, the vacant area of the working region is decreased when a large quantity of data is processed.

The registered data stored in the working region is sometimes deleted.

Since the cache memory 109 is the exclusive region, a predetermined capacity is always secured. In this embodiment, the developed scalable font pattern is stored in the cache memory or the working region.

The idle font table 202 is a table for storing the attribute of the font which is made to be the idle font. The current font table 203 is a table for storing information about the font which is being used during the previous operation for processing data. The character order table 204 is a table which stores the order to the characters to be developed and stored. The character frequency table 205 is a table for storing the characters used in the previous data processing operations and the number of uses.

Figure 3:
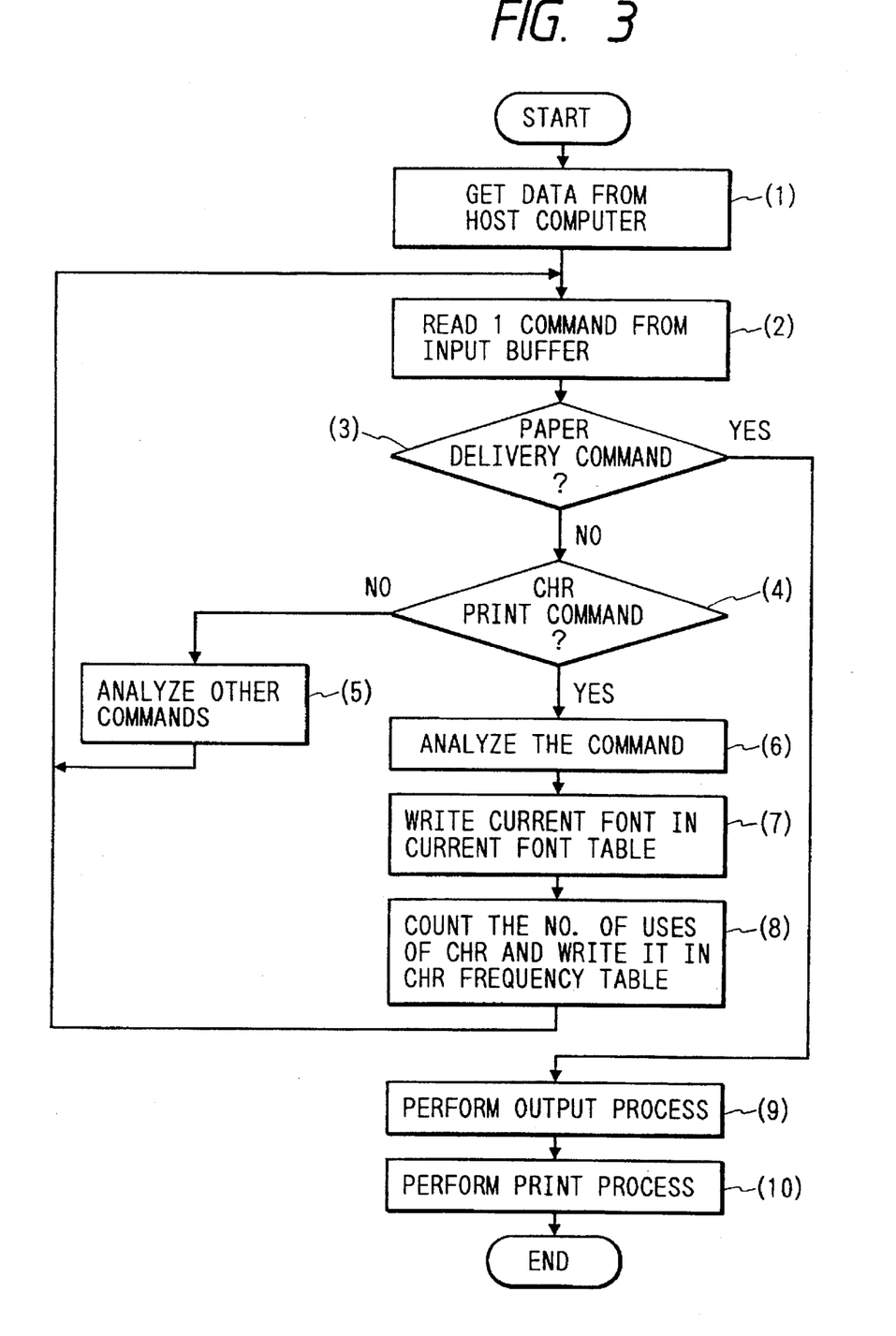
FIG. 3 is a flow chart which illustrates an example of a first procedure of processing data employed in a character processing method according to an embodiment of the present invention.

FIG. 3 is a flow chart which illustrates an example of a first procedure of processing data employed in the character processing method according to the first embodiment of the present invention. In FIG. 3, parenthesized numbers (1) to (10) represent steps.

First, data supplied from the host computer 101 is received (step 1), and one command is read (received) from the input buffer 103 (step 2). Then, a discrimination is made whether or not the read command is a command that means a page break such as a paper-discharge command (step 3). If an affirmative discrimination is made, the flow proceeds to step 9. If a negative discrimination is made, a discrimination is made whether or not the command relates to the character printing operation (step 4). If the command does not relate to the character printing operation, other commands are analyzed. Further, intermediate data for drawing data on the bit map memory 108 is made, the data being written on the page buffer memory 107 (step 5). If the command relates to the character printing operation, the command is analyzed as usual (step 6) in such a manner that discriminations are made whether or not the pattern in the cache memory or the like is used and that the pattern must be newly developed and the pattern development is performed.

Then, the attribute of the current font, such as the name, is written on the current font table 203 shown in FIG. 2 (step 7). The number of times of use of the character is counted and the result of counting is written in the character frequency table 205 shown in FIG. 2 (step 8), the flow being then returned to step 2.

If the command read in step 3 is the command which means the page break, such as the paper-discharge command, an output process is performed (step 9) in which data is drawn in the bit map memory 108 in accordance with the data in the page buffer memory 107. Further, the printing process is performed to output a visible image on the print paper (step 10), and the process is completed.

If a Ming font and a Gothic font are used in a mixed manner in step 7, the contents in the current font table 203 are changed whenever the font is changed.

The data processing operation by making use of the idle font table 202 shown in FIG. 2 will now be described with reference to a flow chart shown in FIG. 4.

Figure 4:
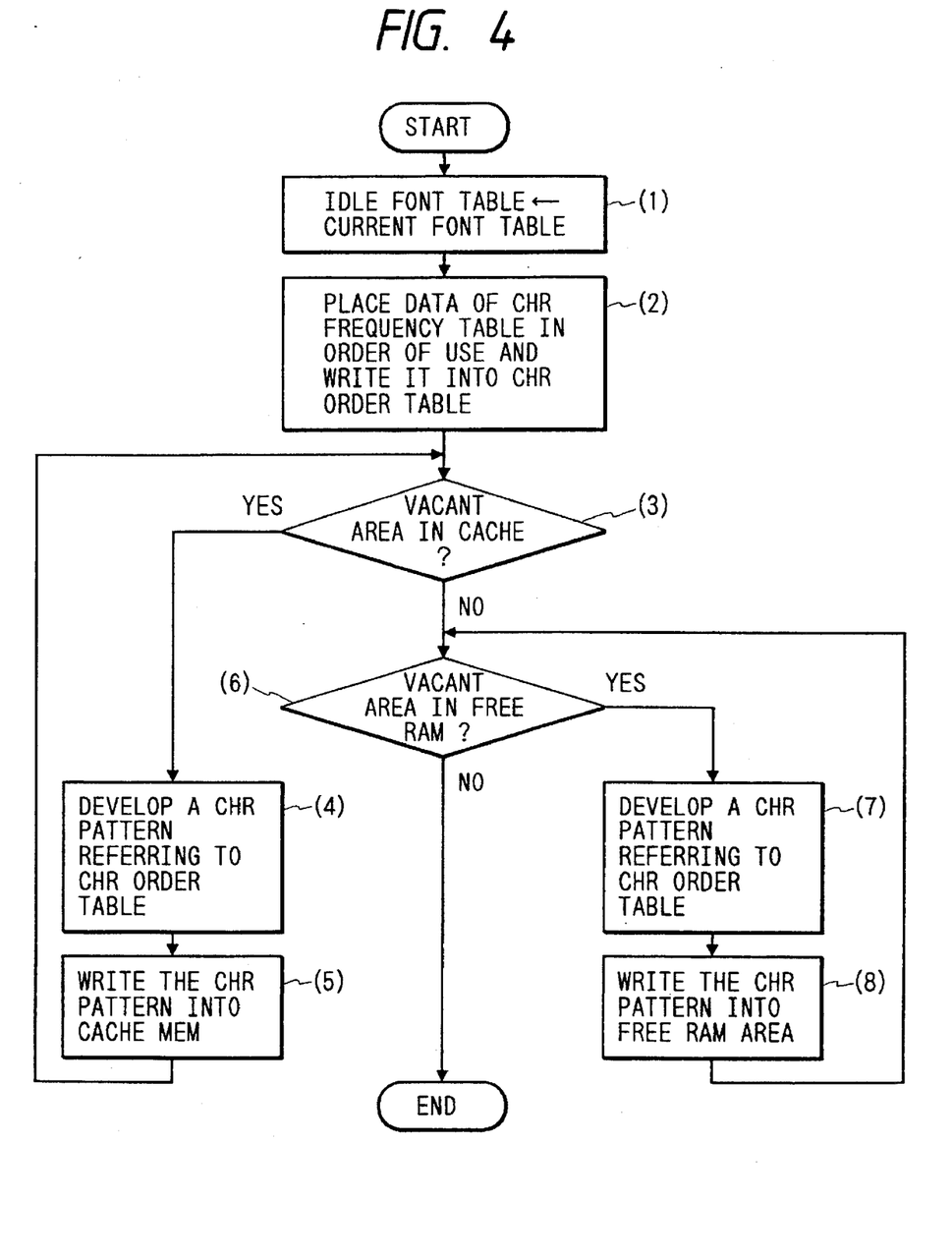
FIG. 4 is a flow chart which illustrates an example of a process for controlling the portion in which the character pattern is developed by making use of the idle font table shown in FIG. 2.

FIG. 4 is a flow chart which illustrates an example of a process for controlling the portion in which the character pattern is developed by making use of the idle font table 202 shown in FIG. 2.

When the LBP is brought into an idle state, the CPU 104 writes the font, written in step 7 shown in FIG. 3 in the current font table 203 shown in FIG. 2, in the idle font table 202 shown in FIG. 2 so that the idle font is determined (step 1). Then, the CPU 104, in step 8 shown in FIG. 3, sorts information written in the character frequency table 205 shown in FIG. 2 in the ascending order of the frequency of use to write the information in the character order table 204 shown in FIG. 2 (step 2). As a result, the CPU 104 serving as the prediction means is able to register always the character pattern, which will probably be used in the next output process, in the cache memory 109.

Then, a discrimination is made whether or not a vacant area is present in the cache memory 109 (step 3). If a vacant area is present, the character pattern is developed in accordance with the information in the character order table 204 (step 4), and the character pattern is written on the cache memory 109 (step 5). If a discrimination has been made in step 3 that no vacant area is present in the cache memory 109 serving as the region for exclusively storing the character pattern, the CPU 104 discriminates in step 6 whether or not a vacant area is present in the free RAM 201 (the working region). If a vacant area is present, the character pattern is sequentially developed in accordance with information in the character order table 204 (step 7), and the pattern is written on the free RAM 201 (step 8), and then the flow proceeds to step 6.

As described above, the character processing method according to the present invention is arranged in such a manner that information about use of the sequentially generated character patterns is gotten during a process of data supplied from the host apparatus such as the host computer 101 while referring to the scalable font data to be stored in the font memory 110. In standby state in which a process of data supplied from the host apparatus is waited, the character patterns, which will probably be used hereafter, are sequentially stored in the RAM 201 while analyzing the information about use of the gotten character pattern. At the time of commencement of an ensuing process of data supplied from the host apparatus, the character pattern, which coincides with the received data, is preferentially read from the memory. Therefore, the character pattern, which will probably be used, is always stored even if ensuing received data is somewhat changed. As a result, the time taken to complete the process of developing the character pattern with respect to the received data can be shortened.

The reason why the data is preferentially written in the cache memory 109 and writing in the free RAM 201 is performed after the cache memory 109 has been filled with the data is that the possibility of deleting the character pattern in the cache memory, which is the exclusive region, is lower than that when the same is stored in the RAM 201, and the risk of the deletion can be relatively eliminated in a case where the character pattern is stored in the cache memory.

If a discrimination has been made in step 6 that no vacant area is present in the free RAM 201, the idle font process is completed. If data is received during the idle font process, the idle font process is, of course, immediately completed.

Although the immediately previous font used as the attribute is designated as the idle font, the font used most frequently may be designated as the idle font. In this case, the font used most frequently in the output process as the attribute, that is, a font frequency table 203A shown in FIG. 5, is provided for the control table 201A of the RAM 201 in place of the current font table 203 shown in FIG. 2 to store the number of print characters of each font.

Figure 5:
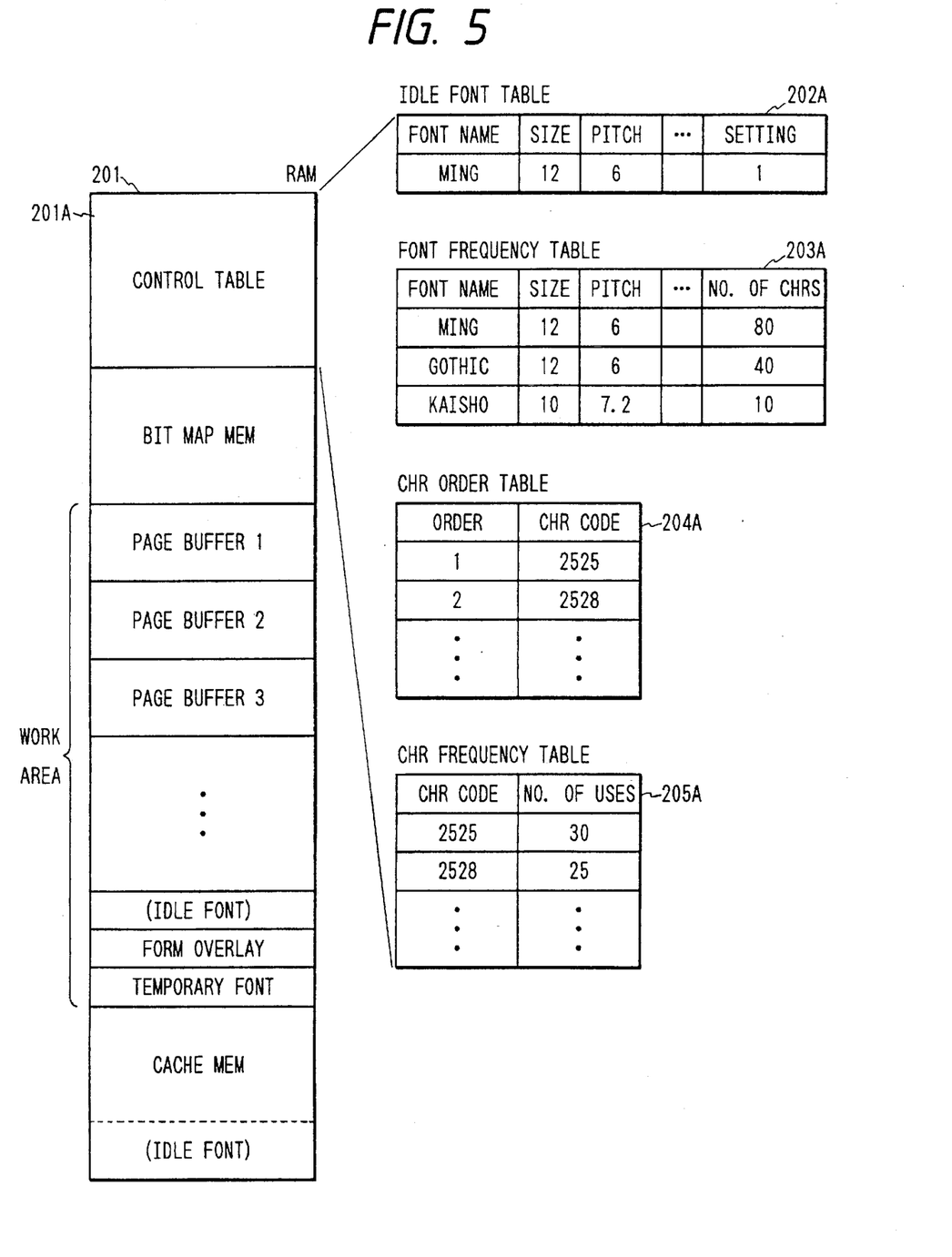
FIG. 5 is a schematic view which illustrates another memory map of the RAM shown in FIG. 1.

FIG. 5 is a schematic view which illustrates another memory map of the RAM 201 shown in FIG. 1.

Referring to FIG. 5, reference numeral 201A represents a control table comprising an idle font table 202A, a font frequency table 203A, a character order table 204A and a character frequency table 205A.

Figure 6:
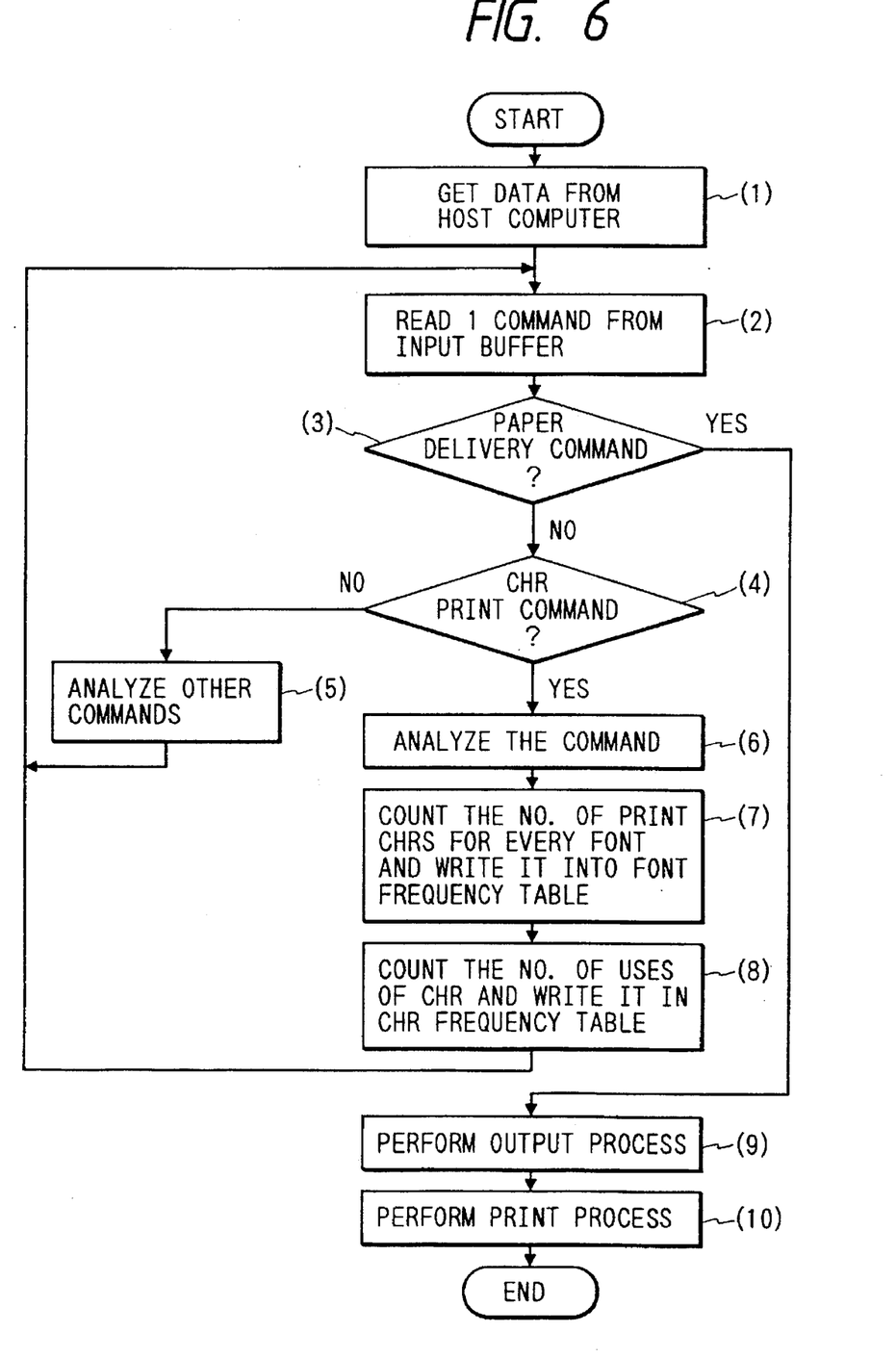
FIG. 6 is a flow chart which illustrates an example of a second procedure of processing data employed in the character processing method according to the embodiment of the present invention.

FIG. 6 is a flow chart which illustrates an example of a second procedure of processing data employed in the character processing method according to the embodiment of the present invention.

First, data supplied from the host computer 101 is received (step 1), and one co, and is read (received) from the input buffer 103 (step 2). Then, a discrimination is made whether or not the read command is a command that means a page break such as a paper-discharge command (step 3). If an affirmative discrimination is made, the flow proceeds to step 9. If a negative discrimination is made, a discrimination is made whether or not the command relates to the character printing operation (step 4). If the command does not relate to the character printing operation, other commands are analyzed. Further, intermediate data for drawing data on the bit map memory 108 is made, the data being written on the page buffer memory 107 (step 5). If the command relates to the character printing operation, the command is analyzed as usual (step 6) in such a manner that discriminations are made whether or not the pattern in the cache memory or the like is used and that the pattern must be newly developed and the pattern development is performed.

Then, the number of print characters for every font is counted and is written into the font frequency table 203A shown in FIG. 5 (step 7) and the number of use of the character is counted and is written into the character frequency table 205 shown in FIG. 2 (step 8 ), the flow being then returned to step 2.

If the command read in step 3 is the command which means the page break, such as the paper-discharge command, an output process is performed (step 9) in which data is drawn in the bit map memory in accordance with the data in the page buffer memory 107. Further, the printing process is performed to output a visible image on the print paper (step 10), and the process is completed.

Figure 7:
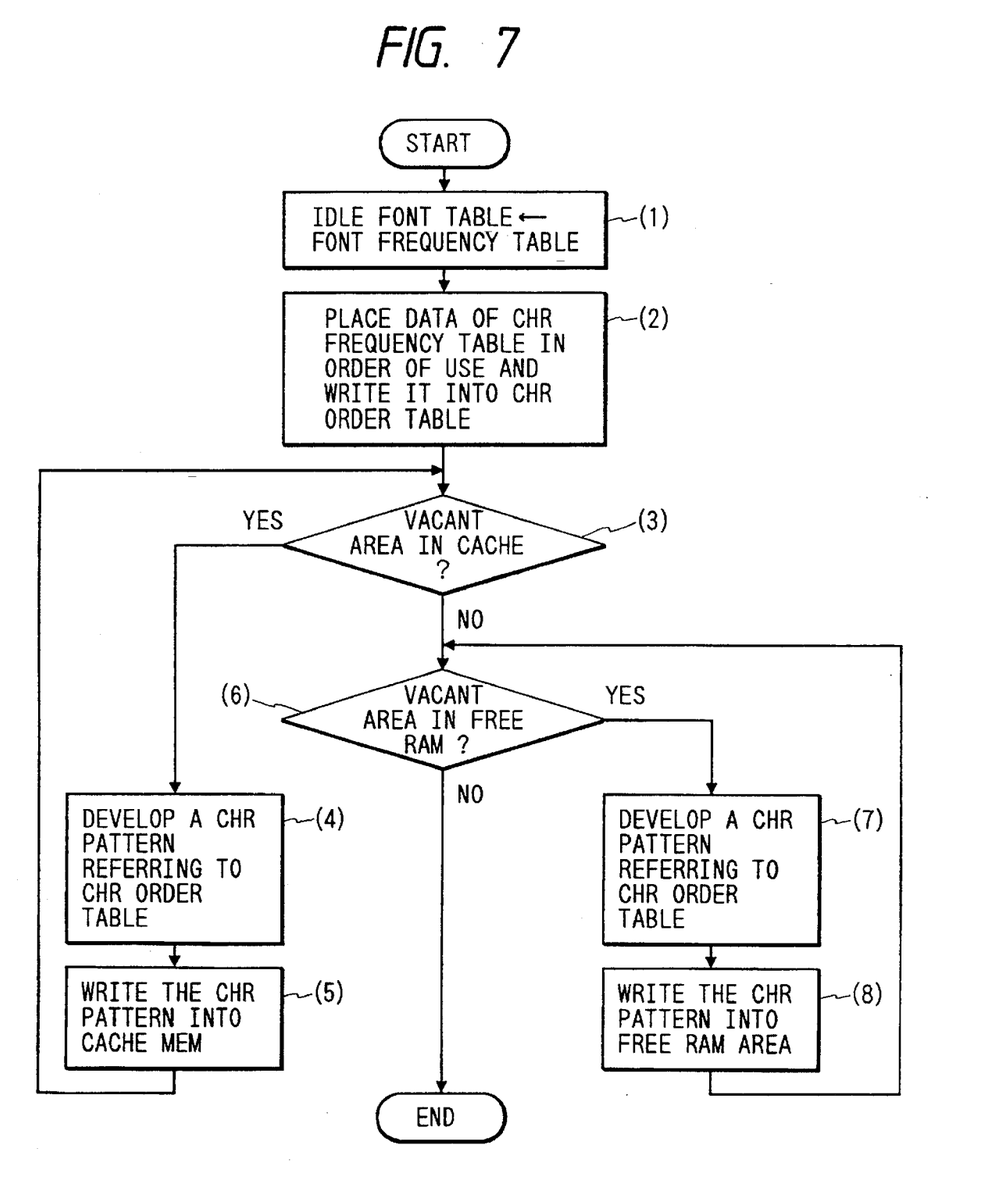
FIG. 7 is a flow chart which illustrates an example of a process for controlling the portion in which the character pattern is developed by making use of the idle font table shown in FIG. 2.

FIG. 7 is a flow chart which illustrates an example of a process for controlling the portion in which the character pattern is developed by making use of the idle font table 202 shown in FIG. 2. In FIG. 7, parenthesized numbers (1) to (8) are steps.

When the LBP is brought into an idle state, the font frequency table 203A shown in FIG. 5 is referred to set the font, the characters of which have been printed most frequently, in the idle font table 202A (step 1).

In step 8 shown in FIG. 3, information written in the character frequency table 205 shown in FIG. 2 is sorted in the descending order of the number of uses to write information in the character order table 204 shown in FIG. 2 (step 2). Then, a discrimination is made whether or not a vacant area is present in the cache memory 109 (step 3). If the vacant area is present, the character pattern is developed in accordance with information in the character order table 204 (step 4) to write the pattern in the cache memory 109 (step 5). If a discrimination has been made in step 3 that no vacant area is present in the cache memory 109, a discrimination is made whether or not a vacant area is present in the free RAM 201 (step 6). If a vacant area is present, the character pattern is sequentially developed in accordance with information in the character order table 204A (step 7) to write the pattern in the free RAM 201 (step 8), and the flow returns to step 6.

Figure 8:
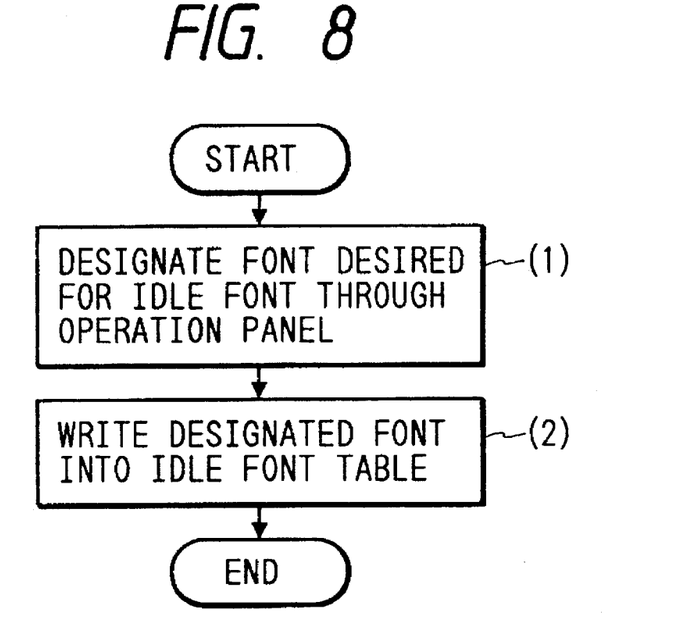
FIG. 8 is a flow chart which illustrates an example of a procedure of the idle font designating process employed in the character processing method according to the embodiment of the present invention.

Although the foregoing embodiment is arranged in such a manner that the discrimination of the font to be designated as the idle font is automatically made by the LBP, another arrangement may be employed in which it is designated by a user and the idle font is fixed as shown in FIG. 8.

FIG. 8 is a flow chart which illustrates an example of a procedure of the idle font designating process employed in the character processing method according to an embodiment of the present invention. Referring to FIG. 8, parenthesized numbers (1) and (2) are steps.

First, the operation panel 112 shown in FIG. 1 is used as setting means to designate the font intended to be the idle font (step 1), and the designated font is set in the idle font table 202 shown in FIG. 2 (step 2). If the font is set as described above, the process in step 7 shown in FIG. 3 is not executed. Another structure may be employed in which the font can be designated with a command.

Another structure may be employed in which the setting of the font to be made the idle font is arbitrarily switched between the idle setting by the LBP and fixing to meet flexibly desires of a user.

Figure 9:
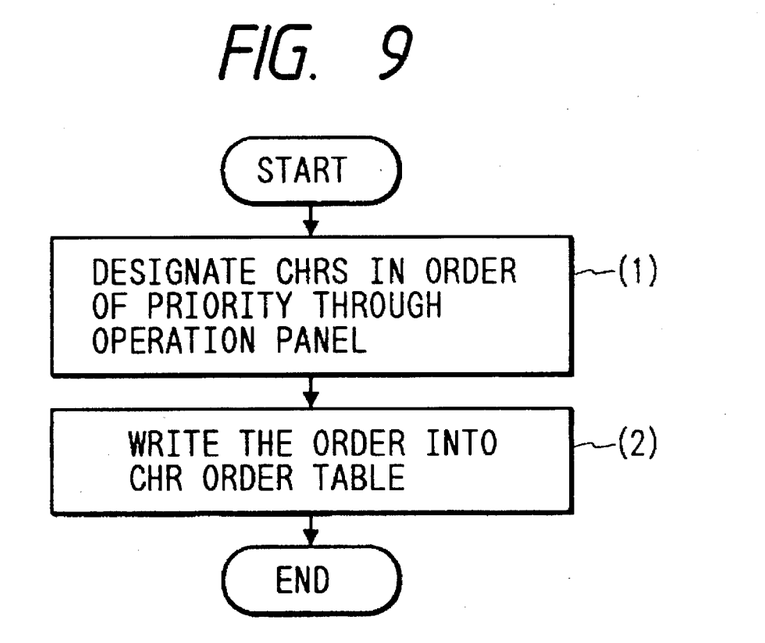
FIG. 9 is a flow chart which illustrates an example of a procedure of the process for designating the order of the development of the idle font characters employed in the character processing method according to the embodiment of the present invention.

Although the foregoing embodiment is arranged in such a manner that the order of the development of the idle font is set by an operation of counting the number of uses performed by the CPU 104 in the LBP, another structure may be employed in which a user is able to set an arbitrary order as shown in FIG. 9.

FIG. 9 is a flow chart which illustrates an example of a procedure of the process for designating the order of the development of the idle font characters employed in the character processing method according to an embodiment of the present invention. In FIG. 9, parenthesized numbers (1) and (2) are steps.

First, the operation panel 112 is used to designate sequentially the characters in the descending order of the priority (step 1) while employing the JIS code or the like as the designation method. After the designation has been completed, the designated characters are set in the character order table shown in FIG. 2 (step. 2). If the order of developing the idle font characters is designated, the process in step 8 shown in FIG. 3 is not executed.

Although the foregoing embodiment is arranged in such a manner that the table for determining the development order of the idle font characters is provided for the free RAM 201 and the development order is rewritten in accordance with the state of the printer sequence, another structure may be employed in which the order is fixed in accordance with a usual character frequency and the table of the order is disposed in, for example, the ROM 105.

Although the foregoing embodiment is arranged in such a manner that the table for determining the development order of the idle font characters is disposed in the RAM or the ROM, characters, such as kana, alphabets and numbers, that are considered to be used particularly frequently are set in table fixed in the ROM, and kanji and other characters are set in accordance with the state of the table in the RAM to enable the two tables to be used.

Although the foregoing embodiment is arranged in such a manner that one font is developed, another structure may be employed in which a plurality of fonts can be developed.

Figure 10:
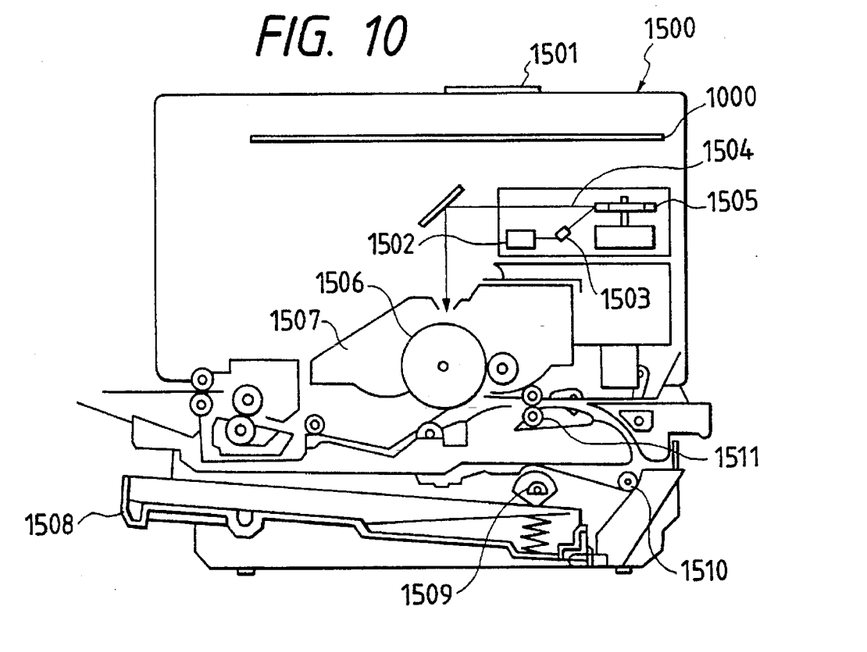
FIG. 10 is a cross sectional view which illustrates the structure of a recording apparatus to which the present invention is adapted.

FIG. 10 is a cross sectional view which illustrates the structure of a recording apparatus to which the present invention is adapted, the recording apparatus being, for example, a laser beam printer (LBP).

Referring to FIG. 10, reference numeral 1500 represents a LBP body (printer) that receives and stores print information (the character code and the like) supplied from an external host computer and form information or a macro-command and the like. Further, the LBP body 1500 makes a corresponding character pattern (to be generated due to the character pattern process according to the present invention) and a form pattern according to the foregoing information items to form an image on recording paper which is the recording paper. Reference numeral 1501 represents an operation panel on which operation switches and LED displays are disposed, and 1000 represents a printer control unit for controlling the overall operation of the LBP body 1500 and for analyzing character information supplied from the host computer. The printer control unit 1000 mainly converts character information into a video signal denoting the corresponding character pattern, and transmits the video signal to a laser driver 1502. The laser driver 1502 is a circuit for driving a semiconductor laser 1503, the laser driver 1502 being arranged to switch on/off the emission of laser beams 1504 from the semiconductor laser 1503 in response to the supplied video signal. The laser beams 1504 are swung laterally by a rotative polygon mirror 1505 to scan and expose the surface of an electrostatic drum 1506. As a result, an electrostatic latent image of the character pattern is formed on the electrostatic drum 1506. The latent image thus-formed is developed by a developing unit 1507 disposed to surround the electrostatic drum 1506, and then transferred to recording paper. The recording paper formed into cut sheets is accommodated in a paper cassette 1508 fastened to the LBP body 1500 as to be introduced into the apparatus by paper supply rollers 1509, conveyance rollers 1510 and 1511. As a result, the cut sheets are supplied to the electrostatic drum 1506.

Figure 11:
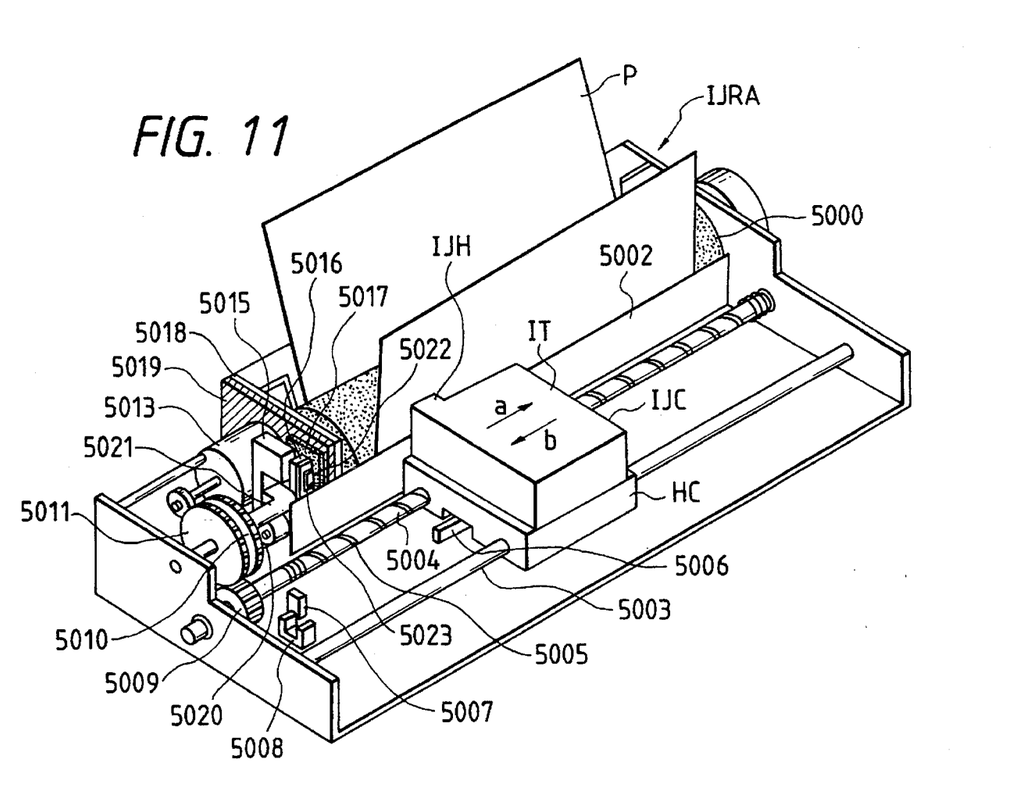
FIG. 11 is a cross sectional view which illustrates the structure of another recording apparatus to which the present invention is adapted.

FIG. 11 is a cross sectional view which illustrates the structure of another recording apparatus to which the present invention can be adapted, the recording apparatus being, for example, an ink jet recording apparatus (IJRA).

Referring to FIG. 11, a carriage HC, which engages to a spiral groove 5004 of a lead screw 5005 in synchronization with the forward/rearward rotations of a drive motor 5013 while interposing rotational force transmission gears 5011 and 5009, has a pin (omitted from illustration). The carriage HC is reciprocated in directions designated by arrows a and b, respectively. The carriage HC has an ink jet cartridge IJC mounted thereon. Reference numeral 5002 represents a retaining plate that presses the paper against a platen 5000 in a direction in which the carriage is moved. Reference numerals 5007 and 5008 represent photo-couplers that serve as home position detection means which confirm the presence of a lever 5006 of the carriage HC in the foregoing region to switch the method of rotating the drive motor 5013. Reference numeral 5016 represents a member for supporting a cap member 5022 for capping the overall surface of a recording head. Reference numeral 5015 represents suction means for sucking the inside portion of the cap, the suction means 5015 sucking and recovering the recording head through an aperture 5023 formed in the cap. Reference numeral 5017 represents a cleaning blade that is enabled to move longitudinally by a member 5019. Reference numeral 5018 represents a body support plate that supports the cleaning blade 5017 and the member 5019. Reference numeral 5021 represents a lever for commencing the suction of the suction recovery operation, the lever 5021 being moved when a cam 5020 engaged to the carriage HC is moved. As a result, the rotational force of the drive motor 5013 is used to move and control the carriage HC by known transmission means such as a clutch.

The structure is arranged in such a manner that the capping, cleaning and suction recovery operations are performed at corresponding positions as described by the operation of the lead screw 5005 when the carriage HC is brought to the home position region. However, there is a simple necessity that the structure is arranged in such a manner that the desired operations are performed known timing.

When recording information is, via an interface (omitted from illustration) supplied to the recording apparatus constituted as described above from the host computer, the character and line pattern generation process is performed while using the storage region, such as the RAM, as described above. Further, the bit map data for data units corresponding to the engine of the recording apparatus is read to be recorded on the recording medium.

As described above, the character processing method according to the present invention is arranged in such a manner that information about use of the sequentially generated character patterns is gotten during a process of data supplied from the host apparatus while referring to the scalable font data to be stored in the font memory. In standby state in which a process of data supplied from the host apparatus is waited, the character patterns, which will probably be used hereafter, are sequentially stored in the RAM while analyzing the information about use of the gotten character pattern. At the time of commencement of an ensuing process of data supplied from the host apparatus, the character pattern, which coincides with the received data, is preferentially read from the memory. Therefore, the character pattern, which will probably be used, is always stored even if ensuing received data is somewhat changed. As a result, the time taken to complete the process of developing the character pattern with respect to the received data can be shortened.

The character processing apparatus according to the present invention is structured in such a manner that, if the discrimination means has discriminated that the state for processing the data supplied from the host apparatus is in the standby state, the permission means permits the output character pattern to the storage means in accordance with information about use gotten by the getting means, and the character pattern registered in the storage means is retrieved in accordance with data received from the host apparatus to switch the source for generating the character pattern, which coincides with the received data, to the storage means or the pattern generating means. Therefore, the character pattern, which will probably be used, is always stored in the storage means even if ensuing received data is somewhat changed. As a result, the character pattern can be generated while preferentially reading the generated character pattern.

Since the structure is arranged in such a manner that the storage means is secured in an exclusive storage region in a predetermined storage medium or a vacant area in a working area and the character pattern is preferentially registered in the exclusive storage region, deletion of the character pattern which will probably be used due to access made to the working area from another portion can be prevented.

Since the structure is arranged in such a manner that the prediction means analyzes the information about use of the character patterns gotten by the getting means to predict a character pattern which will probably be used, a character pattern which will probably be used can always be stored even if the state of use is changed.

Since the structure is arranged in such a manner that the prediction means refers to the attribute of a font used immediately previously or to the attribute of a font which has been gotten by the getting means and which is output frequently during standby for processing data supplied from the host apparatus so that a character pattern which will probably be used is predicted, a character pattern, which will probably be used, can be predicted in accordance with the font attribution.

Therefore, the following excellent effect can be obtained: the time taken to complete the process of printing the scalable font can be shortened. By previously developing the font which will probably be used, the time taken to output the scalable font can further be shortened. Further, the generated character pattern can be stored in the exclusive region, resulting in that the character pattern can correctly be stored even if data access to the working region takes place. In addition, a vacant area formed on the working region can be used so that the memory can efficiently be used.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A character processing apparatus which uses character pattern information generated from a previously-used scalable font when outputting image information for subsequent characters, said apparatus comprising:

memory means for storing attribute information of a font which was used in generating previous character pattern information; and registration means for generating, when said apparatus is in an idle state, character pattern information for subsequent characters from a scalable font having attribute information of the previously-used scalable font based on the attribute information stored in said memory means, and for registering the generated character pattern information.

2. An apparatus according to claim 1, wherein said registration means generates character pattern information based on a general character usage frequency fixedly stored in advance in said memory means.

3. An apparatus according to claim 1, further comprising designation means for designating attribute information, wherein said memory means stores the designated attribute information.

4. An apparatus according to claim 3, wherein said designation means comprises a panel.

5. An apparatus according to claim 1, further comprising output means for outputting the generated output image information.

6. An apparatus according to claim 5, wherein said output means comprises a printer.

7. An apparatus according to claim 1, further comprising a host computer for giving information for generating the output image information.

8. A character processing method which uses character pattern information generated from a previously-used scalable font when outputting image information for subsequent characters, said method comprising the steps of:

storing attribute information of a font which was used in generating previous character pattern information in a memory; and when in an idle state, generating character pattern information for subsequent characters from a scalable font having attribute information of the previously-used scalable font based on the stored attribute information, and registering the generated character pattern information.

9. A method according to claim 8, wherein said registering step generates and registers the character pattern information based on a general character usage frequency fixedly stored in advance in the memory.

10. A method according to claim 8, further comprising the step of designating attribute information, wherein the designated attribute information is stored in the memory.

11. A method according to claim 10, wherein said designating step designates the attribute information with a panel.

12. A method according to claim 8, further comprising the step of outputting the generated output image information.

13. A method according to claim 12, wherein said outputting step outputs the output information with a printer.

14. A method according to claim 8, further comprising the step of receiving information for generating the output image information from a host computer.

15. A storage medium which stores a program used in a character processing apparatus, which uses character pattern information generated from a previously-used scalable font when outputting image information for subsequent characters said program comprising the steps of:

storing attribute information of a font which was used in generating previous character pattern information in a memory; and when the apparatus is in an idle state, generating character pattern information for subsequent characters from a scalable font having attribute information of the previously-used scalable font based on the stored attribute information, and registering the generated character pattern information.

16. A storage medium according to claim 15, wherein said registering step generates and registers the character pattern information based on a general character usage frequency fixedly stored in advance in the memory.

17. A storage medium according to claim 15, wherein the program further comprises the step of designating attribute information, wherein the designated attribute information is stored in the memory.

18. A storage medium according to claim 17, wherein said designating step designates the attribute information with a panel.

19. A storage medium according to claim 15, wherein the program further comprises the step of outputting the generated output image information.

20. A storage medium according to claim 19, wherein said outputting step outputs the output image information with a printer.

21. A storage medium according to claim 15, wherein the program further comprises the step of receiving information for generating the output image information from a host computer.

* * * * *

UNITED STATES PATENT AND TRADEMARK OFFICE
CERTIFICATE OF CORRECTION

PATENT NO. : 5,666,478

DATED : September 9, 1997

INVENTOR : Yoko Nishikawa

It is certified that error appears in the above-identified patent and that said Letters Patent is hereby corrected as shown below:

COLUMN 3

Line 52, "page" should read --the input data--; and (2nd occur.)
   Line 53, "the input data" should be deleted.

COLUMN 4

Line 28, "portion" should read --portion,--.

COLUMN 5

Line 63, "the-current" should read --the current--.

COLUMN 7

Line 24, "use" should read --uses--.

COLUMN 8

Line 14, "flexibly" should read --flexibility--.

UNITED STATES PATENT AND TRADEMARK OFFICE
CERTIFICATE OF CORRECTION

PATENT NO. : 5,666,478

DATED : September 9, 1997

INVENTOR : Yoko Nishikawa

Page 2 of 2

It is certified that error appears in the above-identified patent and that said Letters Patent is hereby corrected as shown below:

COLUMN 11

Line 10, "particularly" should read --particularity--.

Signed and Sealed this

Thirty-first Day of March, 1998

Attest:

BRUCE LEHMAN

Attesting Officer

Commissioner of Patents and Trademarks